Sept. 21, 1943.   R. W. PALMER   2,330,185
AIRPLANE WING CONSTRUCTION
Filed Dec. 5, 1940   2 Sheets-Sheet 1
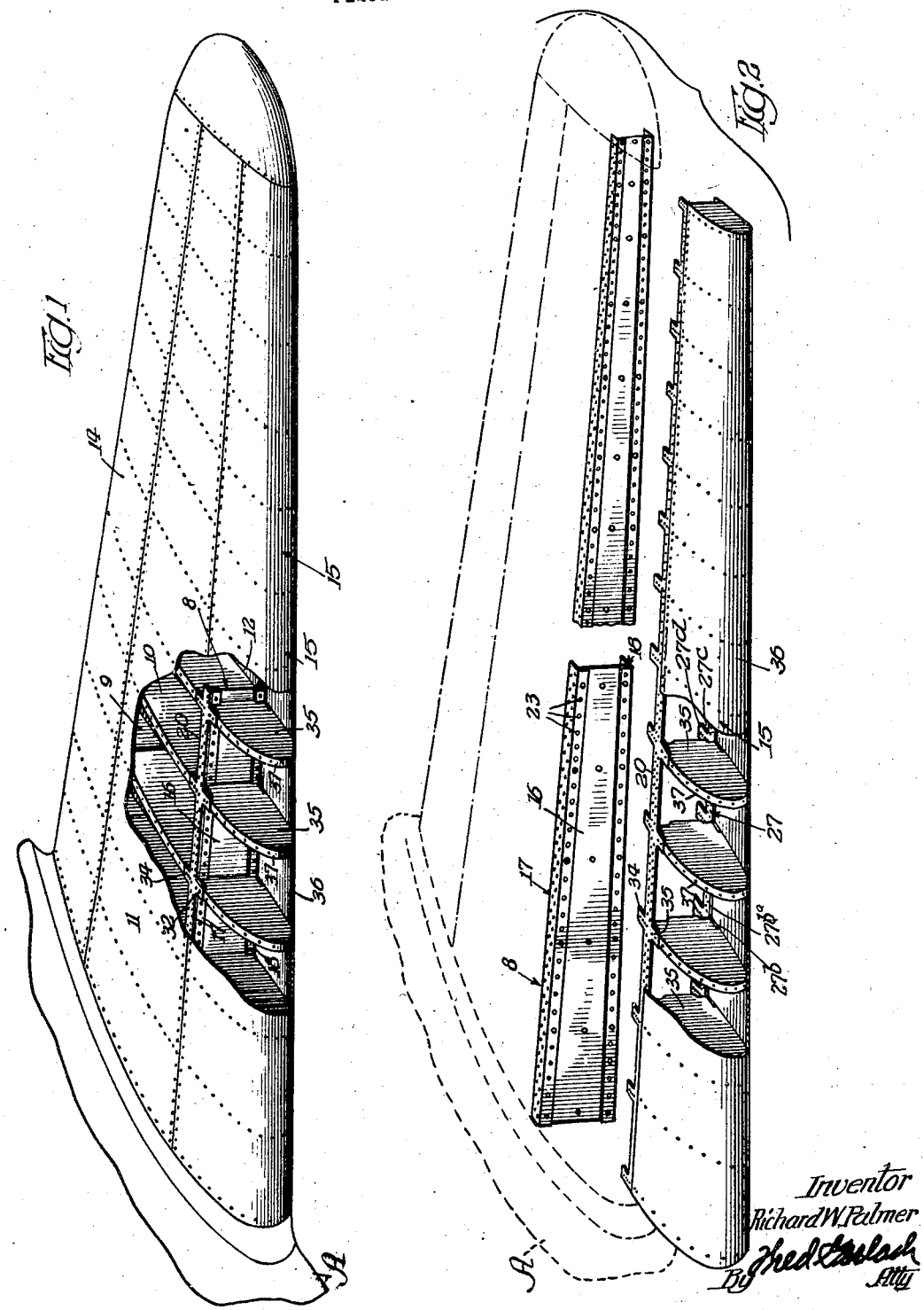
Inventor
Richard W. Palmer

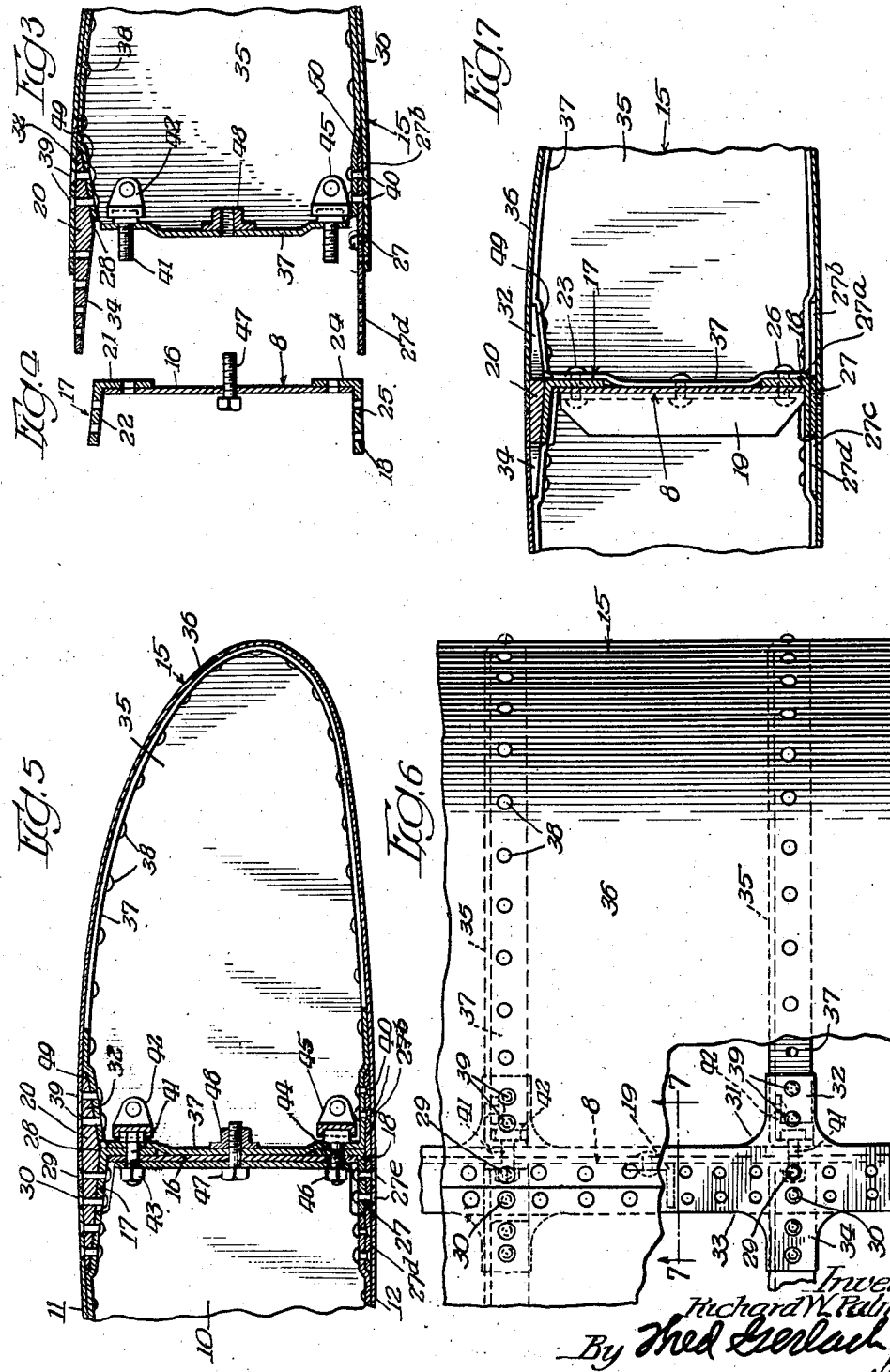

Patented Sept. 21, 1943

2,330,185

UNITED STATES PATENT OFFICE 2,330,185

AIRPLANE WING CONSTRUCTION

Richard W. Palmer, Whittier, Calif., assignor to Vultee Aircraft, Inc., Downey, Calif., a corporation of Delaware Application December 5, 1940, Serial No. 368,597

11 Claims. (Cl. 244—123)

The invention relates generally to airplane wing construction. More particularly the invention relates to the construction and design of that type of airplane wing which is formed of metallic parts or structural elements and comprises in addition to a longitudinally extending rear spar, intermediate and rear cross ribs and intermediate and rear skin parts, a longitudinally extending front spar in spaced relation with the rear spar and abutting against the front portions of the intermediate cross ribs, and a front or nose part in the form of a series of laterally spaced flanged nose ribs in front of the front spar, and a nose skin of U-shaped cross section extending around the nose ribs and riveted to the front spar.

It has heretofore been customary in connection with a wing of this type to provide the upper and lower margins of the front spar with cap strips of T-shaped cross section in order to provide for riveting of the upper and lower margins of the nose skin to the front spar. It has also been customary to rivet or bolt the rear portions of the flanges of the nose ribs to the front spar and to provide comparatively large hand or access holes in the front spar so as to make it possible to bolt or otherwise secure the nose ribs to the front spar as well as rivet the upper and lower margins of the nose skin to the cap strips. A wing, the front spar of which has access holes, is objectionable because such holes materially weaken or reduce the strength of the wing as a whole.

One object of the present invention is to provide an airplane wing of this type which is an improvement upon and eliminates the objectionable features or disadvantages of previously designed wings of the same general character by reason of the fact that the construction and design are such that provision of access holes in the front spar is unnecessary.

Another object of the invention is to provide an airplane wing of the aforementioned type and character which is so constructed and designed that the nose part, that is the sub-assembly of nose ribs and nose skin, may be quickly and readily attached to the front spar.

A further object of the invention is to provide an airplane wing which is generally of new and improved construction and not only may be assembled with facility but also is capable of withstanding exceptionally large loads without failure.

Other objects of the invention and the various advantages and characteristics of the present airplane wing will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective view of an airplane wing embodying the invention, parts being broken away for the purpose of illustration;

Figure 2 is a perspective view of the nose part and front spar, showing them before assembly;

Figure 3 is a vertical transverse section of the nose part of the wing;

Figure 4 is a vertical transverse section of the front spar of the wing showing the same prior to attachment to the nose part, i. e., the subassembly of nose ribs and nose skin;

Figure 5 is a vertical transverse section showing the nose part and front spar in their assembled position;

Figure 6 is a fragmentary plan view of the front portion of the wing, parts being broken away to show the construction and design of the upper cap strip and the manner in which the rear portions of the nose web flanges are attached to the front spar; and Figure 7 is a section on the line 7—7 of Figure 6.

The wing which is shown in the drawings constitutes the preferred embodiment of the invention. It is designed and adapted for use as part of an airplane A and comprises a longitudinally extending front spar 8, a longitudinally extending rear spar 9, intermediate cross ribs 10, top and bottom intermediate skin parts 11 and 12, rear cross ribs (not shown), a rear skin part 14, and a nose part 15. The rear spar 9 of the wing is spaced rearwardly from the front spar 8 by the intermediate cross ribs 10 and embodies at its inner end or the root portion of the wing suitable means (not shown) for attaching it to the fuselage of the airplane A. The intermediate cross ribs 10 are in the form of a series and are spaced apart. They have inwardly projecting marginal flanges and serve as the supporting medium for the top and bottom intermediate skin parts 11 and 12. The skin part 11 extends across and is riveted to the upper portions of the flanges of the intermediate cross ribs 10 and the bottom intermediate skin part 12 extends across and is riveted to the lower portions of such flanges. The rear cross ribs are connected to, and project rearwardly from, the rear spar 9 and are surrounded by the rear skin part 14. They are marginally flanged similarly to the intermediate cross ribs 10 and are aligned with the latter.

The front spar 8 is of composite design or character and comprises a vertically extending web 16, an upper angle bar 17, a lower angle bar 18, vertically extending stiffeners 19 and a cap strip 20. It is disposed directly in front of, and is suitably secured to, the front portions of the flanges of the intermediate cross ribs 10 and has means (not shown) at its inner or root end for attachment to the airplane fuselage. The web 16 tapers from the root end to its tip, as shown in Figure 2, and is imperforate except for bolt and rivet holes. The upper angle bar 17 extends from one end of the web 16 to the other and consists of a vertical leg 21 and a rearwardly extending leg 22. The vertical leg of the bar 17 fits against the front face of the upper marginal portion of the web 16 and is secured in place by rivets 23. The leg 22 is joined to, and extends rearwardly from, the upper margin of the vertical leg 21 and overlies the top edge of the web 16. It extends upwards at an extremely small acute angle with respect to the horizontal and constitutes the supporting medium for the cap strip 20. The lower angle bar 18, like the upper bar 17, extends from one end of the web 16 to the other. It is of one piece design and comprises a vertically extending leg 24 and a rearwardly extending leg 25. The vertically extending leg fits against the front face of the lower margin of the web 16 and is secured in place by means of rivets 26. The rearwardly extending leg 25 is joined to the lower margin of the vertical leg 24 and underlies the bottom or lower edge of the web 16. It extends at substantially right angles to the vertical leg and has a cap strip 27 secured to its bottom face. The vertically extending stiffeners 19 serve to prevent horizontal bending of the web 16 of the front spar 8 and are of angle bar construction. They are riveted or otherwise secured to the rear face of the web 16 and are disposed midway between the intermediate cross ribs 10 of the wing. The cap strip 20, like the upper angle bar 17, extends from one end of the web 16 to the other. It is triangular in cross section and has a substantially flat top face. The front portion of the bottom face of the cap strip extends upwards at a slight angle with respect to the horizontal and joins the rear portion of such face in an apex line 28. The rear portion of the bottom face of the cap strip extends upwards at an extremely slight angle with respect to the horizontal and rests upon the top face of the rearwardly extending leg 22 of the upper angle bar 17. The cap strip is so arranged that the apex line 28 between the front and rear portions of the bottom face engages the corner of the bar 17. Front rivets 29 and rear rivets 30 extend through the rearwardly extending leg 22 of the bar 17 and the superjacent portion of the cap strip and serve to hold the cap strip in fixed relation with the upper bar 17 and the web 16 of the front spar 8. The front portion of the cap strip is milled or otherwise constructed so that it has alternately arranged cutouts 31 and lugs 32 and the rear margin of the rear portion of the strip is milled to form alternately arranged cutouts 33 and lugs 34. The cutouts 31 and 33 serve as far as the cap strip is concerned to maintain an optimum ratio of weight to strength. They are positioned in opposed relation and are aligned with the spaces between the intermediate cross ribs 10. The lugs 32 project forwards and taper in a forward direction due to the contour or shape of the front portion of the cap strip. The lugs 34 are rearwardly tapered and are in alignment with the lugs 32. The rivets 29 and 30, as shown in Figures 5 and 6, extend through the body of the cap strip, i. e., the inner part of the rear portion of the strip. Such body is trapesoidal in cross section. The cap strip 27 extends from one end of the web 16 to the other. It is stamped from flat metal stock and projects forwards and rearwards of the rearwardly extending leg 25 of the lower angle bar 18. The front portion of the strip 27 is milled or otherwise constructed so that it has alternately arranged cutouts 27$^a$ and lugs 27$^b$ and the rear margin of said strip is milled or formed with alternately arranged cutouts 27$^c$ and lugs 27$^d$. The cutouts 27$^a$ and 27$^c$ are positioned in opposed relation and are aligned with the spaces between the intermediate cross ribs 10. The lugs 27$^b$ project forwards while the lugs 27$^d$ project rearwards and are in alignment with the lugs 27$^b$. Rivets 27$^e$ extend through the central portion of the lower cap strip 27 and the horizontal leg 25 of the lower angle bar 18 and serve to attach the cap strip to such bar.

The nose part 15 constitutes the leading portion of the wing and comprises a series of laterally spaced nose ribs 35 and a nose skin 36. The ribs 35 correspond in number to, and are aligned with, the intermediate cross ribs 10. They embody marginal flanges 37 and have their front ends curved or rounded. The skin 36 of the nose part is U-shaped in cross section and surrounds and is supported by the ribs 35. Rivets 38 extend through the front and upper and lower central portions of the flanges 37 and the adjacent portions of the nose skin and serve to hold the skin and ribs of the nose part in connected relation. The upper margin of the nose skin 36 projects beyond the rear portions of the flanges 37, as shown in Figures 3, 5 and 6. It overlies the front portion of the top face of the cap strip 20 and is secured to the lugs 32 by rivets 39 and the front rivets 29. The rivets 39 extend through and are carried by the lugs 32, as shown in Figure 6. The lower margin of the nose skin projects rearwards beyond the rear portions of the flanges 37 and laps the front portion of the cap strip 27. Rivets 40 extend through aligned holes in the lower margin of the nose skin and the lugs 27$^b$ and serve to hold such margin in connected relation with the front spar 8. The flanges 37 of the nose ribs 35 extend at right angles to the ribs. The upper ends of the rear portions of the flanges 37 are forwardly offset to accommodate the vertically extending leg 21 of the upper angle type bar 17 and are secured to the front spar by way of bolts 41. The heads of these bolts are confined in polygonal sockets in angle brackets 42 on the upper rear corners of the nose ribs 35 and the shanks extend through aligned holes in the upper ends of the rear portions of the flanges 37, the vertical leg 21 of the bar 17 and the upper margin of the web 16 and carry nuts 43 at their rear ends. The lower ends of the rear portions of the flanges 37 are forwardly offset to accommodate the vertical leg 24 of the lower angle type bar 18 and are secured to the front spar 8 by means of bolts 44. The heads of the last mentioned bolts are confined in polygonal sockets in angle brackets 45 on the rear lower corners of the nose ribs 35 and the shanks extend through aligned holes in the lower ends of the rear portions of the flanges 37, the vertical leg 24 and the bar 18 and the lower margin of the web 16 and have nuts 46 at their rear ends. The central parts of the rear portions of the flanges 37 are connected to the adjacent central portion of the web 16 by way of bolts 47 and nuts 48. The nuts are welded or otherwise fixedly secured to the front faces of the central parts of the rear portions of the flanges 37. The heads of the bolts 47 abut against the rear face of the web 16 and the shanks of such bolts pass through aligned holes in the central portion of the web and the central parts of the rear portions of the flanges 37 and fit within the nuts 48, as shown in Figure 5. The rear parts of the upper portions of the flanges 37 of the nose ribs 35 are offset in such manner that they extend downwardly and rearwardly and define forwardly tapered wedge shaped pockets 49 for snugly receiving the forwardly projecting tapered lugs 32 of the upper cap strip 20. The rivets 39 for anchoring parts of the upper margin of the nose skin 36 pass through the pocket forming parts of the flanges 37 and thus connect such parts to the cap strip 20 of the front spar 8. The rear parts of the lower portions of the flanges 37 are upwardly offset so as to define pockets 50 for the lugs 27ᵇ of the lower cap strip 27.

The construction and design of the front spar 8 and the nose part 15 are such that the nose part may be connected to the front spar without the necessity of providing hand or access holes in the web 16. The mode or manner of assembling the nose part with respect to the front part is as follows: First, the nose ribs 35 are inserted into and properly positioned within the nose skin 36. Thereafter the nose skin and nose ribs are connected together by way of the rivets 38. Thereafter the cap strip 20 while disconnected from the other parts of the spar 8 is manipulated so as to bring the lugs 32 thereof into the pockets 49. As soon as the lugs 32 are in place the rivets 39 are applied so as to connect together the pocket forming rear parts of the upper portions of the flanges 37, the lugs 32 and the upper margin of the nose skin 36. After connection of the upper cap strip 20 to the nose part 15 the lower cap strip 27 while disconnected from the other parts of the front spar 8 is manipulated so as to bring the lubs 27ᵇ thereof into the pockets 50. After this operation the rivets 40 are applied so as to connect together the pocket forming rear parts of the lower portions of the flanges 37, the lugs 27ᵇ and the lower margin of the nose skin 36. This results in a sub-assembly of the type shown in Figure 3, i. e., an assembly or unit comprising the nose ribs 35, the nose skin 36 and the cap strips 20 and 27. Upon completion of the sub-assembly the web 16 is moved or shifted into place against the rear portions of the flanges 37 of the nose ribs. When the web 16 is in place the vertical leg 21 of the upper angle type bar 17 fits within the forwardly upper ends of the rear portions of the flanges 37, the rearwardly extending leg 22 of such bar bears against the bottom face of the body of the cap strip 20, and the vertical leg 24 of the lower angle bar 18 fits within the forwardly offset lower ends of the rear portions of said flanges 37. During shift of the web 16 into place the shanks of the bolts 41 pass through the holes that are provided for them in the leg 21 and the upper margin of the web 16 and the shanks of the bolts 44 pass through the holes that are provided for them in the leg 24 and the lower margin of the web 16. Connection or attachment of the nose part to the front spar is effected by applying the rivets 29 and 40 and the nuts 43 and 46. Because of the location and arrangement of these rivets and nuts connection of the nose part of the wing to the front spar is effected without the use of access holes in the web 16. In connection with attachment of the nose part to the front spar the bolts 47 are connected to the nuts 48 on the central parts of the rear portions of the flanges 37. After connection of the nose part and the front spar the wing is completed or built up by adding the intermediate cross ribs 10 and the top and bottom intermediate skin parts 11 and 12 and then adding the rear spar 9, the rear cross ribs 13 and the rear skin 14.

The herein described wing is capable of withstanding large loads because of the absence of hand or access holes in the web 16 of the front spar 8. By employing as part of the front spar a cap strip the front portion of which is of triangular cross section it is not necesasry to have the rear ends or parts of the upper portions of the flanges 37 deeply or severely downwardly offset. Another advantage of employing a cap strip of the aforementioned type resides in the fact that the nose skin 36 of the nose part 15 is effectively and efficiently supported at the points where it bridges the front ends of the lugs 32.

The invention is not to be understood as restricted to the details set forth since these may be modified within the scope of the appended claims without departing from the spirit and scope of the invention.

Having thus described the invention what I claim as new and desire to secure by Letters Patent is:

1. An airplane wing comprising a longitudinally extending front spar embodying a normally vertical web and a substantively coextensive angle bar having one leg thereof secured to one margin of the web and its other leg projecting rearwards at an obtuse angle with respect to the web, and a unitary nose assembly embodying a series of laterally spaced normally vertical web-type nose ribs positioned in front of the spar and having the rear portions thereof abutting against, and connected to, said web, a nose skin of U-shaped cross section extending around, and secured to, the front, upper and lower portions of the nose ribs and having the margins thereof terminating adjacent the upper and lower margins of the spar, and a longitudinally extending separately formed cap strip serving as an attaching instrumentality for the assembly and having the front margin thereof interposed between, and secured to, the corner portions of the ribs that are adjacent the angle bar and the adjacent portion of the skin and in addition having its rear margin rearwardly tapered and secured to the rearwardly projecting leg of the bar.

2. An airplane wing comprising a longitudinally extending front spar embodying a normally vertical web and a substantially coextensive angle bar having one leg thereof secured to one margin of the web and its other leg projecting rearwards at an obtuse angle with respect to said web, and a unitary nose assembly embodying a series of laterally spaced normally vertical web-type nose ribs in front of the spar having the rear portions thereof abutting against the web, and provided with pockets in the corners thereof that are adjacent said angle bar, a nose skin of U-shaped cross section extending around and secured to the nose ribs and having the margins thereof terminating adjacent the upper and lower margins of the spar, and a separately formed longitudinally extending cap strip serving as an attaching instrumentality for the assembly and having portions of the front margin thereof shaped conformably to, and fitting snugly within, said pockets and secured to the pocket defining portions of the nose ribs and the adjacent portions of the nose skin, and in addition having its rear margin tapered rearwardly, and fitting against and secured to said rearwardly projecting leg of the angle bar.

3. An airplane wing comprising a longitudinally extending front spar in the form of a normally vertical web and a substantially coextensive angle bar extending along one margin of the web and having one leg thereof secured to said margin and its other leg projecting rearwards at an obtuse angle with respect to the web, and a unitary nose assembly embodying a series of laterally spaced parallel normally vertical web-like nose ribs in front of the spar having the rear portions thereof abutting against, and connected to, the web and provided with pockets in the corners thereof that are adjacent said bar, a nose skin extending around and serving to cover the nose ribs and having one margin thereof in lapped relation with the angle bar, and a separately formed longitudinally extending cap strip serving as an attaching medium for the assembly and having portions of its front margin shaped conformably to, and fitting snugly within, the pockets and secured to the pocket defining portions of the ribs and the adjacent portions of the nose skin, and in addition having the rear margin thereof tapered rearwardly, and fitting between, and connected to, the rearwardly projecting leg of the bar and said one margin of the skin.

4. An airplane wing comprising a longitudinally extending front spar embodying a normally vertical web and a substantially coextensive angle bar having one leg thereof connected to one margin of the web and its other leg projecting rearwards, and a unitary nose assembly embodying a series of laterally spaced parallel normally vertical web-like nose ribs in front of the spar having the rear portions thereof abutting against, and connected to, the web, and provided with pockets in the corners thereof that are adjacent the bar, a nose skin of U-shaped cross section extending around and connected to the nose ribs and having the margins thereof terminating adjacent the upper and lower margins of the spar, and a separately formed longitudinally extending cap strip serving as an attaching instrumentality for the assembly and having the front margin thereof provided with laterally spaced lugs corresponding in number to, and fitting within, the pockets and secured to the pocket defining portions of the ribs, and in addition having the rear margin thereof fitting between, and connected to, the rearwardly projecting leg of the bar and the adjacent margin of said nose skin.

5. An airplane wing comprising a longitudinally extending front spar embodying a normally vertical web and a coextensive angle bar having one leg thereof connected to one margin of the web and its other leg projecting rearwards, and a unitary nose assembly embodying a series of laterally spaced parallel normally vertical web-like nose ribs in front of the spar having the rear portions thereof abutting against, and connected to, the web, and provided with forwardly tapered pockets in the corners thereof that are adjacent the bar, a nose skin of U-shaped cross section extending around and serving to cover the nose ribs and having the margins thereof terminating adjacent the upper and lower margins of the spar, and a separately formed longitudinally extending cap strip serving as an attaching instrumentality for the assembly and having the front margin thereof provided with laterally spaced forwardly tapered wedge shaped lugs corresponding in number and shape to, and fitting within, the pockets and secured to the pocket defining portions of the nose ribs and the adjacent portion of the skin, and in addition having the rear margin thereof in lapped relation with, and connected to, the rearwardly projecting leg of the angle bar.

6. An airplane wing comprising a longitudinally extending front spar embodying a normally vertical web and a substantially coextensive obtuse angle bar having one leg thereof extending along and secured to the upper margin of the web and the other leg projecting rearwards and upwards, a unitary nose assembly embodying a series of laterally spaced parallel normally vertical web-like nose ribs in front of the spar having the rear portions thereof abutting against the web, and provided with forwardly tapered pockets in the upper rear corners thereof, a nose skin extending around and serving to cover the front, upper and lower portions of the nose ribs, and a separately formed longitudinally extending cap strip of triangular cross section provided with a flat normally horizontal top face and a pair of upwardly divergent bottom faces, serving as an attaching medium for the nose assembly, and having portions of its front margin fitting and secured within the pockets, and in addition having the rear margin thereof in lapped relation with, and connected to, the rearwardly projecting leg of the angle bar.

7. An airplane wing comprising a longitudinally extending front spar embodying a normally vertical web and a coextensive obtuse angle bar having one leg thereof connected to the upper margin of the web and its other leg projecting rearwards and upwards, and a unitary nose assembly embodying a series of laterally spaced parallel normally vertical web-like nose ribs in front of the spar having the rear portions thereof abutting against, and connected to, the web, and provided with forwardly tapered pockets in the upper inner corners thereof, a nose skin of U-shaped cross section extending around and connected to the front, upper and lower portions of the nose ribs and having the margins thereof terminating adjacent the upper and lower margins of the spar, and a separately formed longitudinally extending cap strip of triangular cross section provided with a flat normally horizontal top face and a pair of upwardly divergent bottom faces, serving as an attaching medium for the assembly and having its front margin provided with cutouts between the ribs and wedge shaped lugs fitting and secured within the pockets, and in addition having the rear margin thereof fitting between, and connected to, the rearwardly projecting leg of the bar and the upper margin of the skin.

8. A unitary assembly designed for use as the nose part of an airplane wing and comprising a series of laterally spaced parallel web-type nose ribs with aligned forwardly tapered pockets in certain of the rear corners thereof, a U- shaped nose skin extending around, and secured to, the front, upper and lower portions of the ribs and having one margin thereof in lapped relation with the pockets, and an elongated longitudinally extending cap strip extending along said one margin of the skin and having the front margin thereof provided with elongated cutouts between the ribs and in addition forwardly tapered lugs disposed between the cutouts, shaped conformably to, and fitting snugly within, the pockets and secured to the pocket defining portions of the ribs and the adjacent portions of said one margin of the skin.

9. A unitary assembly designed for use as the nose part of an airplane wing and comprising a series of laterally spaced parallel web-like nose ribs with pockets in the upper and lower rear corners thereof, a U-shaped nose skin extending around and connected to the front, upper and lower portions of the ribs and having the margins thereof in lapped relation with the pockets, and upper and lower cap strips associated respectively with, and extending longitudinally of, the margins of the skin and having the front margins thereof provided with laterally spaced lugs corresponding in number to, and fitting snugly within, the pockets and secured to the pocket defining portions of the ribs and the adjacent portions of the skin, and in addition having their rear margins provided with laterally spaced rearwardly extending attaching lugs in alignment with the first mentioned lugs.

10. An airplane wing comprising a longitudinally extending front spar in the form of a normally vertical, substantially solid web and a substantially coextensive angle bar extending along one margin of the web and having one leg thereof secured to said margin and its other leg projecting rearwards, and a unitary nose assembly embodying a series of laterally spaced, parallel, normally vertical web-like nose ribs in front of the spar provided with pockets in the corners thereof that are adjacent said bar and having along the rear margins thereof right angle flanges abutting against the web and provided with rearwardly projecting, externally threaded elements which extend through holes in the web and are provided at their inner ends with clamp nuts, a nose skin of U-shaped cross section extending around, and secured to, the nose ribs and having the margins thereof terminating adjacent the upper and lower margins of the spar, and a separately formed longitudinally extending cap strip serving as an attaching instrumentality for the assembly and having portions of the front margin thereof shaped conformably to, and fitting snugly within, said pockets and secured to the pocket defining portions of the nose ribs, and in addition having its rear margin fitting against, and secured to, said rearwardly projecting leg of the angle bar.

11. An airplane wing comprising a longitudinally extending front spar embodying a normally vertical, substantially solid web, a substantially coextensive angle bar having one leg thereof secured to one margin of the web and its other leg projecting rearwards, and a unitary nose assembly embodying a series of laterally spaced, normally vertical, web-type, marginally flanged nose ribs in front of the spar, provided with pockets in the corners thereof that are adjacent said angle bar and having the rear portions of their flanges abutting against the web and provided with rearwardly projecting externally, threaded elements which extend through holes in the web and embody clamp nuts at their rear ends, a nose skin extending around, and serving to cover, the nose ribs and having one margin thereof in lapped relation with the angle bar, and a separately formed, longitudinally extending cap strip serving as an attaching medium for the assembly and having portions of its front margin shaped conformably to, and fitting snugly within, the pockets and secured to the pocket defining portions of the ribs and the adjacent portion of the nose skin, and in addition having the rear margin thereof fitting between, and connected to, the rearwardly projecting leg of the angle bar and said one margin of the skin.

RICHARD W. PALMER.